Sept. 25, 1962            B. G. TAYLOR            3,055,613
ANNULAR WINGED AIRCRAFT WITH TRAILING EDGE WING TAB
Filed Dec. 5, 1957            3 Sheets-Sheet 1

INVENTOR.
BRUCE G. TAYLOR
BY
ATTYS.

Sept. 25, 1962        B. G. TAYLOR        3,055,613
ANNULAR WINGED AIRCRAFT WITH TRAILING EDGE WING TAB
Filed Dec. 5, 1957        3 Sheets-Sheet 2
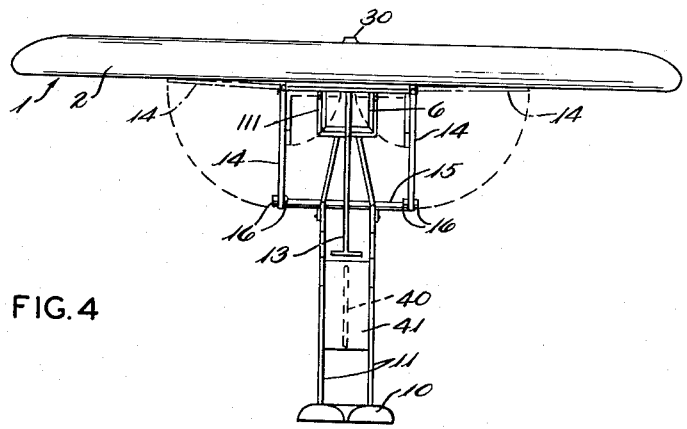
FIG. 4
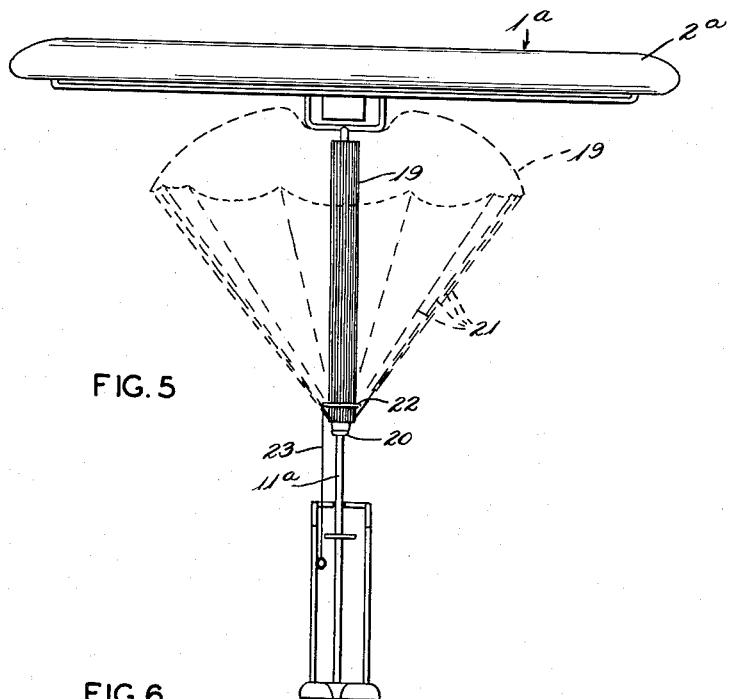
FIG. 5
FIG. 6
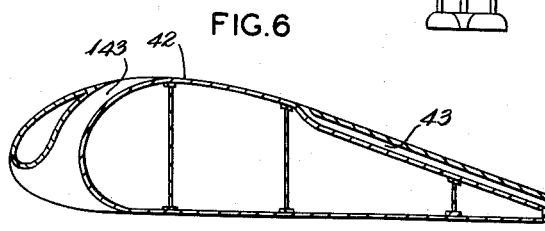
INVENTOR.
BRUCE G. TAYLOR
BY
ATTYS.

Sept. 25, 1962 B. G. TAYLOR 3,055,613
ANNULAR WINGED AIRCRAFT WITH TRAILING EDGE WING TAB
Filed Dec. 5, 1957 3 Sheets-Sheet 3

*INVENTOR.*
BRUCE G. TAYLOR
BY
ATTYS.

United States Patent Office 3,055,613
Patented Sept. 25, 1962

3,055,613
ANNULAR WINGED AIRCRAFT WITH TRAILING EDGE WING TAB
Bruce G. Taylor, 1244 Home Ave., Akron, Ohio
Filed Dec. 5, 1957, Ser. No. 700,782
12 Claims. (Cl. 244—12)

This invention relates to aircraft having longitudinally arcuate wings provided therein, especially to an aircraft that may have an annular wing provided therein and wherein a flexible trailing edge, or a series of movable sections at the trailing edge are provided at such wing surface.

This invention generally relates to the same styles of aircraft as are disclosed in my co-pending patent application Serial No. 617,951 filed October 24, 1956, and any style of aircraft wing as shown therein could be used in practice of the novel trailing edge means of the present invention, but I prefer to use it in combination with a complete generally disc-shaped annular wing surface as illustrated in the accompanying drawings.

The present invention particularly relates to helicopters, or vertical lift aircraft, and usually small, light weight helicopters. In these helicopters, the problem of safety is a major factor that must be considered when determining the aircraft design and/or possible uses of the aircraft. Thus, it is highly desirable that some type of safety means be provided in case of any failure of the aircraft propulsive means.

The general object of the present invention is to provide a novel type of an aircraft having a wing section with an inner arcuate trailing edge wherein a flexible trailing edge is provided on the wing to increase the lift action of the wing under either ascending or descending conditions.

Another object of the invention is to provide a series of pivotally positioned, movable sections at the trailing edge of a wing to move, automatically, upwardly or downwardly with power on or power off in the aircraft to increase the lift action of the wing.

Another object of the invention is to provide a helicopter with a complete annular wing construction and wherein parachute means are provided in association with the aircraft for use on engine failure or other emergency conditions.

Yet another object of the invention is to provide an aircraft of the type referred to and wherein an inflatable style wing can be used in the aircraft.

A further object of the invention is to provide an aircraft wherein a trailing wing edge construction is provided that can be either integral with an inflatable, or rigid wing structure, or be bonded thereto, but wherein the trailing edge is flexible and is adapted to be deflected by air currents passing thereover to facilitate obtaining desirable lift conditions in the wing under operating air flow paths normally encountered in use of the aircraft.

The foregoing and other objects and advantages of the invention will be made more apparent as the specification proceeds.

Reference now should be had to the accompanying drawings, wherein:

FIG. 4 is a front elevation of the aircraft of FIG. 1;

FIG. 5 is an elevation, like FIG. 4, of a modified structure of the invention;

FIGS. 6 through 9 are fragmentary vertical sections of further wing sections of the invention;

When referring to corresponding parts shown in the drawings and referred to in the specification, corresponding numerals are used to facilitate comparison therebetween.

Figure 1:
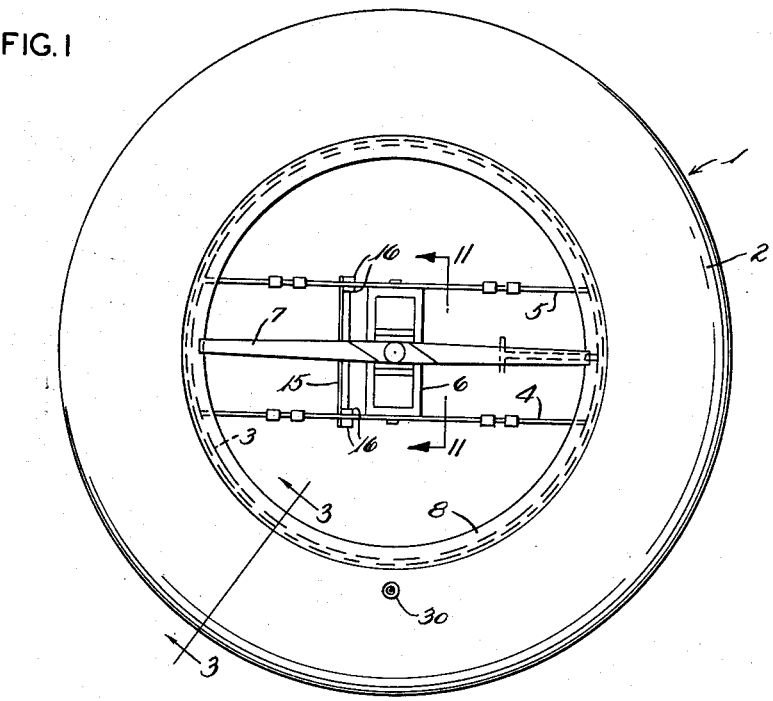
FIG. 1 is a plan view of a helicopter embodying the principles of the invention.
Figure 2:
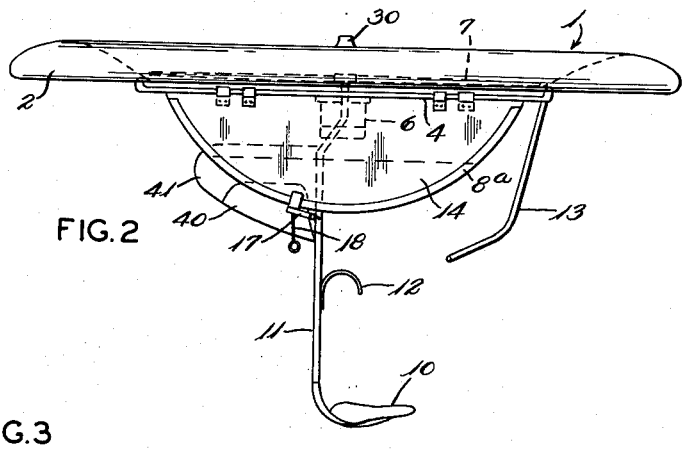
FIG. 2 is a side view of the aircraft of FIG. 1.

Attention is now particularly directed to the details of the construction shown in the drawings, and a helicopter is indicated as a whole by the numeral 1. This helicopter 1 is of the type adapted to carry a single passenger and is of a low cost, but sturdy construction. The helicopter 1 includes an annular, generally disc-shaped inflatable wing 2 which preferably has an annular metal frame 3 provided therein. This frame 3 may be made from aluminum tubing or other material, as desired. A pair of chordal positioned frame bars or tubes 4 and 5 are provided in the helicopter and are suitably secured to the frame 3 and extend therebetween in parallel relationship to each other for supporting a combustion motor, or other desired power unit 6 on the helicopter. The frame bars 4 and 5 are positioned in the open center portion of the wing 2, which is sealed in relation to such frame bars in any conventional manner, as the frame bars extend through the wing 2 to connect to the frame 3.

As an important feature of the invention, the motor 6 drives a propeller 7 either directly or through any suitable gear speed change means (not shown) positioned therebetween. The propeller is so positioned that its edges lie immediately adjacent and over trailing edge portions 8 of the wing 2. Thus the propeller is adapted to draw an air stream down through the center portion of the wing 2 and cause air flow over the trailing edge section or portion 8 of the wing.

The wing 2 is made of a standard air foil section and contour and it may be made from any air tight flexible fabric, any one of the conventional plastic, rubber, or similar material, covered air impervious fabrics being satisfactory.

Figure 3:
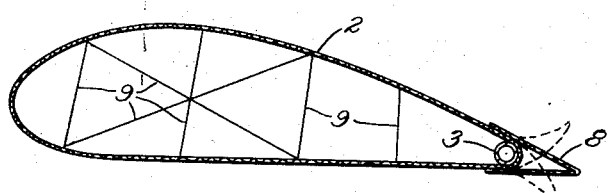
FIG. 3 is an enlarged fragmentary section taken on line 3—3 of FIG. 1.

FIG. 3 of the drawings best indicates that the wing 2 has a plurality of reenforcing cords, strands or similar members 9 suitably secured to the inner surfaces of the fabric means forming the wing 2 and extending vertically and diagonally thereof for reenforcing the wing 2 and aiding it in assuming and maintaining a desired air foil contour. These reenforcing cords 9 can be secured to the associated fabric means comprising the wing defining member by suitable adhesives, or by anchor patches or otherwise, as desired, and these cords can extend in any required manner to aid in holding the wing to proper air foil contour. Some cords obviously may extend longitudinally and/or horizontally in the wing for these reenforcing and shaping purposes.

The trailing edge section or member 8 of the wing 2 can be made from a separate sheet of material molded, or otherwise shaped to approximately the contour indicated in FIG. 3 and with such trailing edge section 8 being likewise formed from air impervious fabric, like the wing 2. If desired, the trailing edge section 8 could be a solid or hollow molded rubber article or be a plastic strip or member wherein such strip has flexibility and will be deflected by the air current passing over the trailing edge of the wing in a manner as outlined hereinafter. Or, a plurality of rigid, or flexible trailing edge strips can be pivotally or torsionally mounted at the wing trailing edges to extend therefrom normally in a neutral position but to move up or down with air streams passing thereover. Thus, the trailing edge section 8 can be moved downwardly to the position indicated in FIG. 3 when the aircraft 1 is operating normally and a downwardly directed air stream is being blasted or streaming thereover, but with the trailing edge section 8 being adapted to be moved upwardly when the aircraft 1 is descending and the motor 6 is not operating. Hence, by such flexible trailing edge section 8, I am able to increase the lifting power of the wing 2 appreciably under normal operating conditions when the aircraft or helicopter 1 is moving upwardly or when it is moving forwardly. However, should it be desired to lower the helicopter 1, or upon motor failure, then it is very important that this trailing edge section 8 be adapted to move or swing upwardly when an air stream moves up through the center portion of the wing 2 by any substantially vertical descent of the helicopter 1. Hence, the trailing edge section 8 aids in obtaining an additional lifting action on the upper surface of the wing under these descent conditions.

The operator of the helicopter 1 is adapted to be carried upon a seat 10 provided on a support arm or arms 11 that may be pivotally or fixedly secured to a portion of the aircraft frame, as by being secured to and suspended from the frame bars 4 and 5. The pilot preferably has shoulder straps or anchor bars 12 carried on the arms 11 and belt means (not shown) also may be provided on these arms 11 to aid in securing the pilot to the aircraft. A control arm 13 is also shown secured to the frame 3 and the pilot can pull or push on such control frame to move or tilt the wing 2 to control flight of the helicopter 1.

A rudder 40 is pivotally secured to a bracket 41 or other conventional member carried by the support arms 11. The rudder 40 may be controlled by any conventional means (not shown) such as a control cable guided through pulleys on the support arms 11 and extending to a point adjacent the pilot.

As a special safety feature of the helicopter 1, a pair of air control flaps 14 preferably are pivotally secured to the frame bars 4 and 5 and extend downwardly therefrom. These air control flaps 14 each preferably have an arcuate lower edge and are of such a shape as to fill, substantially, the portions of the center of the wing 2 intermediate the frame bars 4 and 5 and the subtended portion of the arc of the wing 2 adjacent each one of these frame bars. In inoperative positions, these flaps 14 extend downwardly of the helicopter 1 and usually lie against the support arms 11 on the outer surfaces thereof. The flaps 14 preferably are locked, or retained in this inoperative position as by means of a lock bar 15 which may have pairs of spaced lugs or anchor members 16 provided adjacent the ends thereof for engaging the flaps 14 individually and retaining them in position against the support arms 11 as by an anchor bracket 17 and a control arm 18 may extend from the lock bar 15 to aid in pulling such bar out of engagement with the air control flaps 14.

Should the motor 6 fail and the helicopter 1 start to descend, the pilot would move the lock bar 15, as by use of the control arm 18, so as to free the flaps 14 and air flow up through the center of the wing 2 would normally move such flaps 14 up into engagement with the frame 3 of the wing 2. If necessary, leaf spring lock bars could be carried by the frame 3 to secure the flaps 14 in their raised positions when swung thereagainst by an air current or by the pilot pushing the flaps up, as by use of a pusher stick or bar. Thus the flaps 14 would greatly retard air flow through the center of the wing 2 and braking action would be provided for descent of the helicopter. Only a minimum free air passage space is provided in the helicopter 1 when the flaps 14 are swung up into substantially horizontal positions and when they lie against the lower surface of the aircraft wing 2. These control flaps 14 can be made from any suitable light weight material such as hard board materials, or light weight plastics, or other suitable materials. It should be realized that these flaps 14 must be freely suspended from the frame so as to be ready to swing up into operative positions when needed. The wing 2 or frame tube 3 may have spacer blocks extending downwardly therefrom to hold the flaps 14 slightly spaced from the wing to provide a narrow air flow path past the wing trailing edge. Also, additional flexible trailing edge sections 8a are carried by the arcuate peripheral portions of the flaps 14. Hence, when the flaps 14 are moved to operative positions, the sections 8a will lie adjacent the wing 2 and the sections 8 and 8a will both be forced to curve upwardly by the air stream passing up between such sections.

FIG. 5 shows a slightly modified type of a helicopter 1a of the invention wherein in this instance, a parachute 19 is secured to and carried by a support arm 11a. The support arm 11a has the parachute suitably secured thereto and positioned therearound with an anchor ring or similar member 20 being used for securing the control cords 21 for the parachute 19 to the actual support arm 11a. When it is desired to retain the parachute 19 in its collapsed condition, a securing ring, or equivalent 22 is positioned therearound. A rip cord 23 extends from such ring 22 and permits the pilot to pull such ring 22 from the compressed or packaged parachute 19 when the helicopter 1 is descending so that the parachute 19 can open and extend up to a point adjacent and immediately below and near the edge of a wing 2a of this helicopter 1a. Thus again, air flow through the center portion of the wing of the helicopter will be retarded, and the helicopter will have a slow descent. Air streaming through the center portion of the helicopter will, in such instance, again cause the trailing wing edge section of the aircraft to move upwardly and aid in obtaining additional lift effect from the wing 2a of this helicopter 1 of the invention. Such stream of air moving up past the trailing wing edge section will induce boundary layer air up off the upper wing trailing edge surfaces to maintain longer the decreased air pressure on top of wing to create added lift on the wing as the aircraft is descending and is having a minimum of forward movement at such time.

It should be noted that the trailing edge portion of the present invention can be used with other longitudinally arcuate wing sections as disclosed in my pending patent application referred to hereinbefore, and that the leading edges may be of any desired shape.

However the novel flexible trailing edge 8 can be used with rigid aircraft wings, if desired. The wings may have boundary layer slots therein, as described in my said co-pending application. Hence, in FIG. 6, there is shown a section of a rigid wing 42 which has a boundary layer slot, or duct 43 suitably formed therein and terminating at the trailing edge of the wing. The boundary layer duct 43 and similar means in the aircraft of the invention are shown larger in proportion than they actually would be for illustration purposes. A flexible trailing wing edge section 44 is suitably secured to the wing 42 and protrudes therefrom. The pivotally positioned, longitudinally sectioned rigid edge sections for the wings may be used in this rigid wing 42 which may have a leading edge inlet slot 143 therein as in my co-pending patent application. The boundary layer duct 43 may be omitted in this construction, if desired, but improved results are believed to be secured by use of the duct 43 and the flexible trailing wing edge section 42.

FIG. 6 of the drawings also shows the relationship of the edge or end of the propeller 45 and how it is positioned in association with the trailing edge section 44 of the wing 42.

Figure 7:
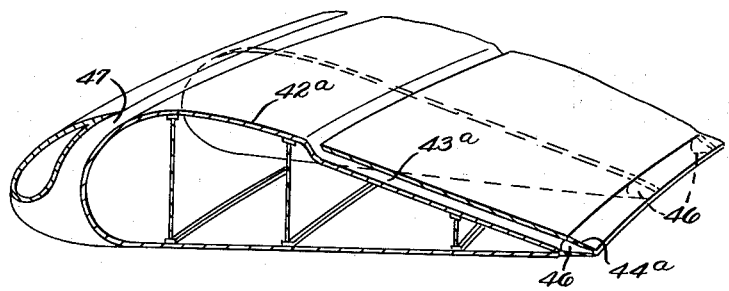

FIG. 7 shows a modified type of a wing 42a wherein a trailing edge duct 43a is provided. A flexible, resilient trailing wing edge section 44a is connected to the wing edge section at the termination of the duct 43 and comprising an extension thereof that blends smoothly into the air foil contour of both the top and bottom of the wing 42a. The trailing section 44a comprises upper and lower sheets joined by webs 46 at spaced portions thereof. Suitable nose intake slots 47 may be provided in the wing 42, as desired.

Figure 8:
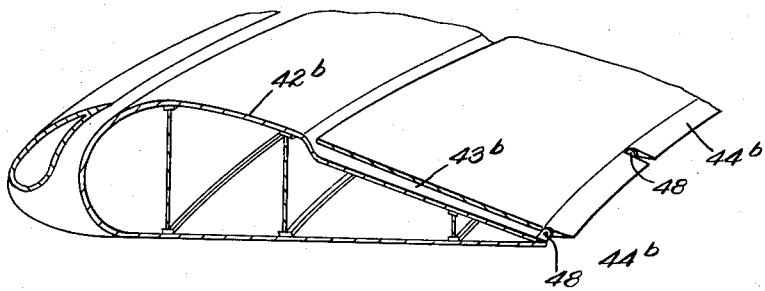

In a wing 42b of FIG. 8, a rigid trailing wing edge section 44b is provided. This trailing wing section or member 44b is positioned within the terminal section of a trailing edge boundary layer duct 43b. The actual trailing edge section 44b comprises a plurality of individually movable members positioned in transverse alignment with each other, in substantially abutting edge contact, on brackets 48 secured to the wing 42b to provide air flow diversion means in the aircraft. These trailing wing edge sections or members 44b are free to be moved through an arc either upwardly or downwardly, by relatively light or small forces applied thereto, dependent upon the path of air flow thereover, and they are suitably positioned on the brackets 48 for such action.

Figure 9:
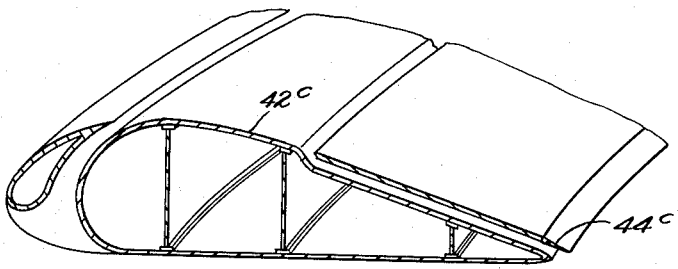

Another trailing edge section 44c for a wing 42c is shown in FIG. 9. In this instance, a solid, resilient trailing edge section 44c is provided and it is secured to the upper margin or member of the wing means defining the boundary layer duct in this aircraft wing. Such wing section 44c protrudes beyond the remainder of the wing.

The trailing edge sections of the invention, for example, would be about twice as long in chord as they are in thickness at their maximum height. The sections terminate in a feather edge and smoothly blend in with the wing contour. They may be secured to the wing by suitable adhesives and may be abutted against a severed wing edge section, or be secured thereto by a bonding or extension strip as in FIG. 3.

Air normally would flow into the trailing edge section 8 when the wing is inflated, as by a conventional valve 30, or the section 8 may have a separate inflation chamber and valve. The other trailing edge sections of the invention could be hollow, or solid, as desired, but must be easily deflected by air currents.

The annular wing 2 should have an angle of incidence, such as about 0° to 15°, and usually about 4° to a horizontal plane to give the aircraft improved stability.

Figure 10:
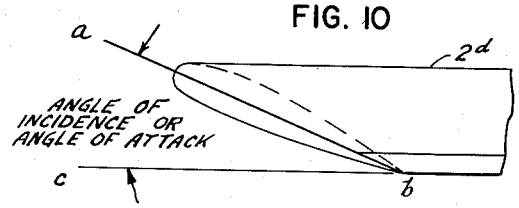
FIG. 10 is a diagrammatic view of an aircraft wing showing the angle of attack of the wing.

FIG. 10 shows a representative angle of attack on a wing 2d. This angle of attack is formed between the chord line ab and a horizontal line cb running through the lower or trailing edge of the wing.

Figure 11:
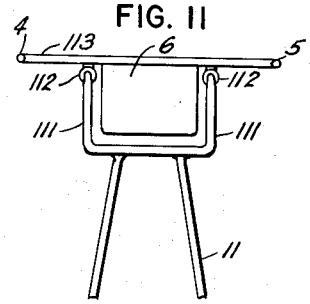
FIG. 11 is a fragmentary vertical section taken on line 11—11 of FIG. 1.

FIG. 11 shows how the support arms 11 may have a U-shaped upper end structure 111 secured thereto and pivotally engaging with members such as eyes 112 suitably secured to a motor mounting plate 113 which itself is fixed to and extends between the frame bars 4 and 5.

By the pilot pulling on the control arm 13 in a direction of front to rear of the aircraft, the wing 2 can be tilted and the aircraft will move forward. Other movement of the control arm 13 will cause movement of the aircraft in other directions. It will be realized that some type of a flexible drive universal coupling, or fluid drive means or the like can be used to connect a drive motor on the frame, if desired, to a driven motor or propeller mounted on the wing, if any relative motion is to occur therebetween when the wing is tilted.

Any air moving means such as a turbine, or jet, can be used in place of the propeller 7 and/or the motor 6 and such means would be secured solidly to the wing by means of a wing support frame in the aircraft and tilt with such wing when the pilot moved the arm 13 to tilt the wing.

From the foregoing, it is seen that a novel and useful helicopter has been provided and that the objects of the invention are achieved.

While several complete embodiments of the invention have been disclosed herein, it will be appreciated that modification of these particular embodiments of the invention may be resorted to without departing from the scope of the invention as defined in the appended claims.

What I claim is:

1. An aircraft comprising an annular wing having a standard air foil section but having a trailing edge of arcuate shape of 360° in length, wing frame means engaging said wing, a pilot support frame secured to said wing frame means and extending across the open center thereof, a horizontally positioned propeller carried by said pilot support frame for creating and providing flow of air over said wing and downwardly past the trailing edge thereof, means for rotating said propeller connected thereto, and a flexible trailing edge member operatively secured to the trailing edge of said wing.

2. An aircraft comprising an annular wing having a standard air foil section but having a trailing edge of arcuate shape of 360° in length, frame means operatively secured to said wing and having a section extending across the open center of said wing, pilot support means pivotally suspended from said frame means, a horizontally positioned propeller carried by said frame means for creating and providing flow of air over said wing and downwardly of the trailing edge thereof, means for rotating said propeller connected thereto, and a flexible trailing edge member operatively associated with said wing.

3. An aircraft as in claim 2 wherein said wing is inflatable and has an annular frame therein to which said trailing edge member is secured.

4. An aircraft as in claim 2, wherein a plurality of air control flaps are pivotally secured to said frame means center section in the center of said wing and normally extend downwardly therefrom, said flaps being movable to horizontal positions to at least substantially fill the center of said wing.

5. An aircraft as in claim 4 wherein said air control flaps have flexible trailing edge means operatively secured to the arcuate peripheral portions thereof.

6. An aircraft comprising an annular wing having a standard air foil section but having a trailing edge of arcuate shape of 360° in length, wing frame means engaging said wing, a pilot support frame secured to said wing frame means and extending across the open center thereof, a horizontally positioned propeller carried by said pilot support frame for creating and providing flow of air over said wing and downwardly past the trailing edge thereof, means for rotating said propeller connected thereto, and air control flaps carried by said support frame and movable to positions substantially in the plane of said wing to retard air flow through the open center thereof and to direct air flow past said wing trailing edge.

7. An aircraft as in claim 2 wherein said pilot support means are suspended below said wing, and where parachute means are secured to said dependent pilot support means, said parachute means when operatively positioned substantially filling the open center of said wing.

8. An aircraft as in claim 2 wherein said wing has upper and lower surfaces and has a boundary layer slot formed in the upper surface and terminating at the trailing edge of said wing.

9. An aircraft as in claim 8 wherein said flexible trailing edge is secured to and forms a continuation of one wing surface at the trailing end of said boundary layer slot.

10. An aircraft comprising a generally disc-shaped annular wing having a standard air foil section but having a trailing edge of arcuate shape of 360° in length, a support frame secured to said wing and extending across the open center thereof, a horizontally positioned propeller carried by said support frame for creating and providing flow of air over said wing and downwardly past the trailing edge thereof, means for rotating said propeller connected thereto, a pilot support pivotally secured to said support frame, and a control arm secured to said wing and engageable by a pilot on said pilot support to tip said wing and provide forward motion for the aircraft, said propeller tipping as a unit with said wing.

11. An aircraft comprising a disc-shaped annular wing having a standard air foil section but having a trailing edge of arcuate shape of 360° in length, a support frame secured to said wing and extending across the open center thereof, air moving means carried by said support frame for creating and providing flow of air over said wing and downwardly past the trailing edge thereof, means for energizing said air moving means to produce air flow connected to such air moving means, a pilot support pivotally secured to said support frame, and a control arm secured to said wing and engageable by a pilot on said pilot support to tip said wing and provide motion for the aircraft, said air moving means tipping as a unit with said wing.

12. An aircraft comprising an annular wing having a standard air foil section but having a trailing edge of arcuate shape of 360° in length, frame means operatively secured to said wing and having a section extending across the open center of said wing, pilot support means pivotally suspended from said frame means, a horizontally positioned propeller carried by said frame means for creating and providing flow of air over said wing and downwardly of the trailing edge thereof, means for rotating said propeller connected thereto, and flexible trailing edge means operatively associated with said wing and forming continuations of both surfaces thereof, terminating adjacent and separate from each other.

References Cited in the file of this patent

UNITED STATES PATENTS

| | | |
|---|---|---|
| 864,672 | McCormick | Aug. 27, 1907 |
| 1,050,921 | Darche | Jan. 21, 1913 |
| 1,155,485 | Hansen-Ellehammer et al. | Oct. 5, 1915 |
| 1,676,549 | Hall | July 10, 1928 |
| 2,876,965 | Streib | Mar. 10, 1959 |
| 2,952,422 | Fletcher | Sept. 13, 1960 |